United States Patent
Yonezawa et al.

(10) Patent No.: US 6,310,138 B1
(45) Date of Patent: Oct. 30, 2001

(54) HYDROGENATED BLOCK COPOLYMER AND POLYPROPYLENE RESIN COMPOSITION CONTAINING THE SAME

(75) Inventors: Jun Yonezawa, Yokohama; Kiyoo Kato, Kawasaki, both of (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/485,130

(22) PCT Filed: Jun. 2, 1999

(86) PCT No.: PCT/JP99/02948

§ 371 Date: Apr. 5, 2000

§ 102(e) Date: Apr. 5, 2000

(87) PCT Pub. No.: WO99/64489

PCT Pub. Date: Dec. 16, 1999

(30) Foreign Application Priority Data

Jun. 5, 1998 (JP) .................................................. 10-157190

(51) Int. Cl.[7] ..................................................... C08L 53/02
(52) U.S. Cl. .................................. 525/88; 525/89; 525/98; 525/240
(58) Field of Search ................................ 525/89, 88, 240

(56) References Cited

U.S. PATENT DOCUMENTS

| | | |
|---|---|---|
| 5,358,986 | 10/1994 | Onofusa et al. . |
| 5,750,612 | * 5/1998 | Zyagawa et al. ....................... 525/89 |
| 6,106,011 | * 8/2000 | Masubuchi et al. .................... 525/89 |

FOREIGN PATENT DOCUMENTS

| | | |
|---|---|---|
| 19815895A1 | 10/1998 | (DE) . |
| 0697435A1 | 2/1996 | (EP) . |
| 0794225A1 | 9/1997 | (EP) . |
| A3188114 | 8/1991 | (JP) . |
| A7 48485 | 2/1995 | (JP) . |
| A8 20684 | 1/1996 | (JP) . |
| 03188114A | 8/1997 | (JP) . |
| A10219040 | 8/1998 | (JP) . |

OTHER PUBLICATIONS

C. A. Sierra et al., Polymer vol. 38 No. 17. pp. 4325–4335 (1997).
Sierra et al., Polymer, 1997, vol. 38, No. 17, pp. 4325–4335.

* cited by examiner

Primary Examiner—James J. Seidleck
Assistant Examiner—Olga Asinovsky
(74) Attorney, Agent, or Firm—Birch, Stewart, Kolasch & Birch, LLP

(57) ABSTRACT

A hydrogenated block copolymer comprising: two polymer blocks A mainly comprising vinylaromatic hydrocarbon compound monomer units; and one hydrogenated polymer block B mainly comprising butadiene monomer units, in which at least 90% of olefinically unsaturated double bonds contained in a polymer block mainly comprising butadiene monomer units before hydrogenation have been hydrogenated, wherein a bonding vinylaromatic hydrocarbon compound content in the hydrogenated block copolymer is higher than 13 wt % but lower than 25 wt %, a 1,2-bond content in the unhydrogenated polymer block mainly comprising butadiene monomer units is higher than 40 mol % but lower than 60 mol %, and the copolymer has a quantity of heat of crystal fusion (ΔH) smaller than 0.05 J/g, an order-disorder transition temperature of 200° C. or higher, and a melt flow rate (MFR) value, as determined in accordance with JIS K7210 under the conditions of a temperature of 230° C. and a load of 2.16 kg, of from not smaller than 0.1 g/10 min to smaller than 30 g/10 min. By incorporating the copolymer into a polypropylene resin, a composition which is suitable for giving a molded article having an excellent balance among impact resistance, brittle temperature, rigidity, heat distortion resistance, and tensile elongation at break, can be obtained.

9 Claims, 1 Drawing Sheet

HYDROGENATED BLOCK COPOLYMER AND POLYPROPYLENE RESIN COMPOSITION CONTAINING THE SAME

This application is the national phase under 35 U.S.C. § 371 of PCT International Application No. PCT/JP99/02948 which has an International filing date of Jun. 2, 1999, which designated the United States of America.

TECHNICAL FIELD

The present invention relates to a hydrogenated block copolymer and a composition thereof. More particularly, this invention relates to a hydrogenated block copolymer characterized by being capable of imparting to a polypropylene resin an excellent balance between such properties as impact resistance, brittle temperature and tensile elongation at break and such properties as heat distortion resistance and rigidity, and the invention further relates to the polypropylene resin composition.

BACKGROUND ART

Polypropylene resin compositions are extensively used as mechanical parts, automotive parts, etc. because they are generally excellent in chemical resistance and mechanical properties. As a result of the recent trend toward size increase and wall thickness reduction in various products in the pursuit of higher functions and higher profitability, there is a desire for polypropylene resin composition excellent in impact resistance, brittle temperature, rigidity, heat distortion resistance, and tensile elongation at break. Tensile elongation at break is one of the properties highly required of polypropylene resin compositions for use as an automotive material from the standpoint of, for example, preventing the material from breaking upon impact to scatter fragments, or enabling the material to absorb an impact through deformation or not to break in creeping. Heat distortion resistance also is one of the highly required properties from the standpoint of providing molded materials which do not deform in a high-temperature atmosphere when exterior automotive materials are coated in a coating line. Brittle temperature, tensile elongation at break, and impact resistance are properties inconsistent with rigidity and heat distortion resistance; namely, an improvement in the former or latter properties results in deterioration in the other. An invention has hence been desired which attains an improved balance among all these parties.

Unexamined Published Japanese Patent Application No. 3-188114 discloses a block copolymer comprising a polymer block formed from a vinylaromatic compound and a hydrogenated isoprene-butadiene block and having a quantity of heat of crystal fusion of 8 cal/g or small. However, this invention requires that the copolymer has an 1,2-bond content of 35% or lower, which gives a composition impaired especially in tensile elongation at break. Furthermore, the relationship between the quantity of heat of crystal fusion and the brittle temperature of a composition of the copolymer is not described or suggested therein. There also is no description of suggestion concerning order-disorder transition temperature or the heat distortion resistance of the composition. Consequently, the objects of the present invention cannot be accomplished with the technique disclosed therein.

POLYMER, Vol.38, No.17 (1997) describes a hydrogenated block copolymer comprising polystyrene and hydrogenated polybutadiene. Described therein are an example having a 1,2-bond content of 50 mol %, a styrene content of 20 wt % and a quantity of heat of crystal fusion of 5.1 J/g and an example having a 1,2-bond content of 40 mol %, a styrene content of 20 wt % and a quantity of heat of crystal fusion of 12.3 J/g. In this article, there is no description at all concerning effects of use of these hydrogenated block copolymers in a composition although mechanical properties of the copolymers are described. Furthermore, those values of the quantity of heat of crystal fusion for the hydrogenated block copolymer are outside of the range according to the present invention because the copolymers are produced through polymerization at an elevated temperature without removing the heat of reaction by cooling. It is therefore apparent that the objects of the present invention cannot be accomplished with the hydrogenated block copolymer described therein.

Unexamined Published Japanese Patent Application No. 8-20684 discloses, as a resin composition excellent in rigidity, heat distortion resistance, impact resistance and moldability, a resin composition comprising crystalline propylene, two hydrogenated block copolymers (a styrene-ethylene/butylene-styrene copolymer and a styrene-ethylene/propylene copolymer), an ethylene-α-olefin copolymer rubber and talc. However, there is no description or suggestion therein concerning the relationship in the hydrogenated block copolymers between the quantity of heat of crystal fusion and brittle temperature or between order-disorder transition temperature and heat distortion resistance. These properties of the disclosed block copolymers are still unsatisfactory.

As described above, neither a hydrogenated block copolymer capable of imparting an excellent balance between such properties as impact resistance, brittle temperature and tensile elongation at break and such properties as heat distortion resistance and rigidity nor a polypropylene resin composition having an excellent balance among these properties has yet been obtained.

An object of the present invention is to provide a hydrogenated block copolymer which makes it possible to provide a polypropylene resin composition having an excellent balance among impact resistance, brittle temperature, tensile elongation at break, rigidity and heat distortion resistance and further having excellent profitability.

Another object of the present invention is to provide a polypropylene resin composition having an excellent balance among the properties.

DISCLOSURE OF THE INVENTION

The present inventors made extensive investigations in order to overcome the problems described above. As a result, they have found that a specific hydrogenated block copolymer is effective in eliminating those problems, and have thus completed the present invention. Namely, the present invention has been completed based on the finding that a specific hydrogenated block copolymer makes it possible to provide a composition having an excellent balance among impact resistance, brittle temperature, rigidity, heat distortion resistance and tensile elongation at break.

The hydrogenated block copolymer of the present invention is a hydrogenated block copolymer comprising:

two polymer blocks A mainly comprising vinylaromatic hydrocarbon compound monomer units; and one hydrogenated polymer block B mainly comprising butadiene monomer units, in which at least 90% of olefinically unsaturated double bonds contained in a polymer block mainly comprising butadiene monomer units before hydrogenation have been hydrogenated, wherein a bonding vinylaromatic hydrocarbon compound content in the hydrogenated block copolymer is higher than 13 wt % but lower than 25 wt %, a 1,2-bond content in the unhydrogenated polymer block mainly comprising butadiene monomer units is higher than 40 mol % but lower than 60 mol %, and the copolymer has a quantity of heat of crystal fusion (ΔH) smaller than 0.05 J/g, an order-disorder transition temperature of 200° C. or higher, and a melt flow rate (MFR) value, as determined in accordance with JIS K7210 under the conditions of a temperature of 230° C. and a load of 2.16 kg, of not smaller than 0.1 g/10 min to smaller than 30 g/10 min.

It is generally known that crystals of a hydrogenated block copolymer disappear when the 1,2-bond content in the unhydrogenated polymer block mainly comprising butadiene monomer units increases to 60 mol % or higher (G. Holden, *Thermoplastic Elastomers*, 2nd Edition, p.301). The present inventors made investigations with the expectation that a hydrogenated block copolymer in which the crystals have disappeared might have improved elastomer performance and give a composition having an excellent balance among properties. However, it has been found that a hydrogenated block copolymer having a 1,2-bond content of 60 mol % or higher, at which crystals disappear, cannot be used in applications where low-temperature performances are required, because the copolymer gives a composition having an impaired brittle temperature. The present inventors have made further investigations based on the new idea that a hydrogenated block copolymer in which the unhydrogenated polymer block mainly comprising butadiene monomer units has a 1,2-bond content lower than 60 mol % and crystals have been diminished gives a composition having a greatly improved balance among mechanical properties. As a result, the present inventors have surprisingly found that a hydrogenated block copolymer which has a 1,2-bond content of from 40 to 60 mol %, where crystals would originally be present, and which either contains no crystalline component or has a quantity of heat of crystal fusion smaller than a specific value gives a composition having a significantly improved balance among properties. The present invention has thus been completed.

The polypropylene resin composition of the present invention comprises (1) from 99 to 60 parts by weight of a polypropylene resin and (2) from 40 to 60 parts by weight of the above hydrogenated block copolymer.

BEST MODES FOR CARRYING OUT THE INVENTION

Figure 1:
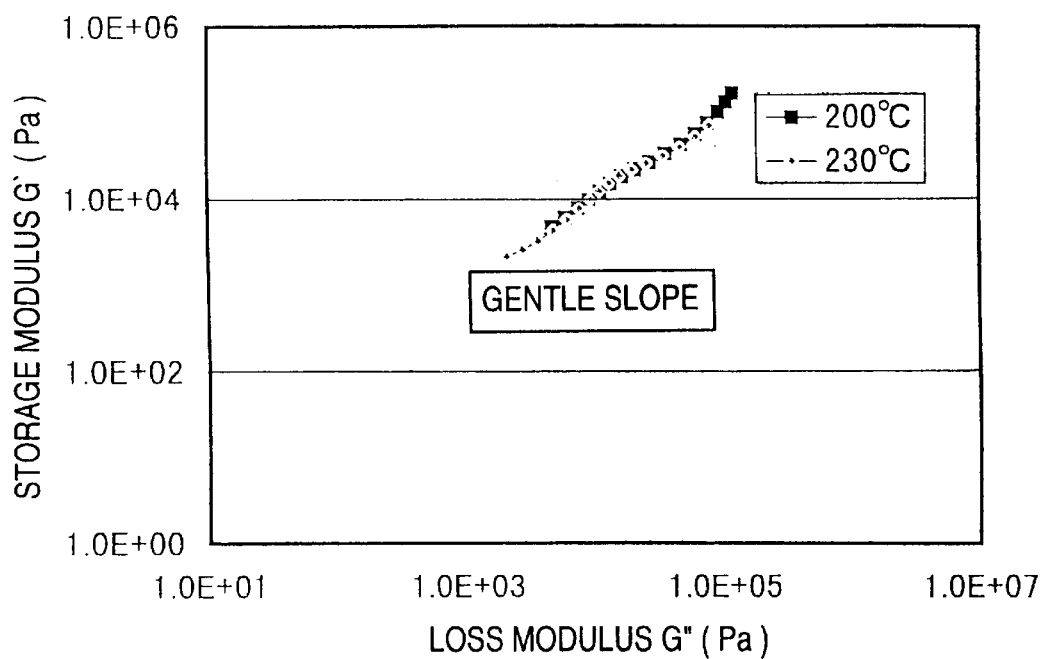
FIG. 1 shows a method for determining the $T_{ODT}$ of SEBS 4.

The hydrogenated block copolymer according to the first aspect of the present invention comprises two polymer blocks A each mainly comprising vinylaromatic hydrocarbon compound monomer units and one hydrogenated polymer block B mainly comprising butadiene monomer units. The vinylaromatic compound monomer units are, for example, one or more members selected from styrene, alkylstyrenes such as α-methylstyrene, p-methlstyrene and p-tert-butylstyrene, p-methoxystyrene, vinylnapthalene, and the like, and are preferably styrene. The content of the vinylaromatic compound monomer units in the block copolymer is higher than 13 wt % but lower than 25 wt %, and is preferably 15 wt % or higher but below 23 wt %, especially preferably 15 wt % or higher but below 20 wt %, from the standpoints of rigidity and brittle temperature. If the content thereof is 13 wt % or lower, rigidity is impaired. If the content thereof is 25 wt % or higher, it results in an increased brittle temperature. The content of the vinylaromatic compound monomer units can be measured with a nuclear magnetic resonance spectrometer (NMR), an ultraviolet spectrophotometer (UV), or the like. The term "mainly comprising" as used in the present invention has the following meaning. For example, in the case of a polymer "mainly comprising vinylaromatic compound monomer units", this polymer may be one formed from one or more vinylaromatic monomers or may be a copolymer thereof with one or more other monomers capable of living anionic polymerization therewith. Examples of such copolymerizable other monomers include conjugated diene compound monomers, methacrylic esters such as methyl methacrylate and butyl methacrylate, cyclohexadiene, and caprolactones. The mode of the copolymerization may be any mode including, e.g., random, alternative and tapered modes. The two polymer blocks A may differ from each other in composition, molecular weight, etc.

The unhydrogenated polymer block mainly comprising butadiene monomer units can have any desired microstructures. The content of 1,2-bonds therein is higher than 40 mol % but lower than 60 mol%, and is preferably from 41 mol % to 55 mol %, more preferably from 46 mol % to 54 mol %. If the content thereof is 40 mol % or lower, the block copolymer may undergo a dispersion failure, resulting in poor elongation. If the content thereof is 60 mol % or higher, the block copolymer is impaired in brittle temperature and heat distortion resistance. It is desirable that the 1,2-bonds be present as evenly as possible (so that there is no local massing of 1,2-bonds) in the polymer chain. The microstructures can be measured with a nuclear magnetic resonance spectrometer (NMR). The term "mainly comprising butadiene monomer units" means also the cases where butadiene monomer has been copolymerized with one or more other monomers capable of living anionic polymerization therewith. Examples of such copolymerizable other monomers include other conjugated diene compound monomers such as isoprene, vinylaromatic compound monomers, methacrylic esters such as methyl methacrylate and butyl methacrylate, cyclohexadiene, and caprolactones. The mode of the copolymerization may be any mode including, e.g., random, alternative, and tapered modes.

The term "mainly comprising" as used in this specification means that these monomer units account for at least more than 50 mol %, desirably 70 mol % or more, more desirably 80% or more, and especially desirably 90% or more of the polymer block.

The hydrogenated block copolymer of the present invention is one in which at least 90% of the olefinically unsaturated double bonds contained in the unhydrogenated polymer block B have been hydrogenated. If the degree of hydrogenation thereof is lower than 90%, the block copolymer shows reduced adhesiveness at polypropylene interfaces to give a composition which is reduced in impact resistance and elongation and deteriorates by the action of the heat, light, etc. to show reduced thermoplasticity. In the blocks A, the unsaturated double bonds of the benzene rings derived from at least one vinylaromatic compound may have been hydrogenated to a degree of up to 20% based on all units derived from the vinylaromatic compound. The degree of hydrogenation can be measured with a nuclear magnetic resonance spectrometer (NMR).

The melt flow rate (MFR) value of the hydrogenated block copolymer as determined in accordance with JIS K7210 (the version published in 1976) under the conditions of a temperature of 230° C. and a load of 2.16 kg must be in the range of from not smaller than 0.1 g/10 min to smaller than 30 g/10 min. The preferred range thereof is from not smaller than 0.1 g/10 min to smaller than 15 g/10 min, the more preferred range thereof is from not smaller than 1.0 g/10 min to smaller than 10 g/10 min, and the especially preferred range thereof is from not smaller than 3.0 to smaller than 8 g/10 min. If the MFR thereof is lower than 0.1 g/10 min, impact resistance is impaired. If the MFR thereof is 30 g/10 min or higher, elongation is insufficient.

The order-disorder transition temperature of the hydrogenated block copolymer of the present invention is 200° C. or higher. If the order-disorder transition temperature of the hydrogenated block copolymer is below 200° C., the composition according to the present invention has impaired heat distortion resistance. The heat distortion resistance of a composition can be judged from the heat distortion temperature of the injection-molded composition. Order-disorder transition temperature is the temperature at which a hydrogenated block copolymer, which is in a two-phase state composed of a rubber phase and a restrained phase around room temperature, comes not to have the two-phase separation state. This order-disorder transition temperature can be determined through X-ray small-angle scattering or a rheological measurement. In the case of making rheological measurement for determining the order-disorder transition temperature, the dynamic storage modulus (G') and loss modulus (G") are measured at various temperatures in a sufficient shear rate range, and the G' is plotted against the G". The order-disorder transition temperature can be determined from the temperature at which the resultant straight lines come to have the same slope and intercept. Alternatively, the order-disorder transition temperature can be determined also from the highest inflection point appearing in a curve obtained by examining the temperature dependence of G' from the higher temperature side at a sufficiently low frequency, e.g., 0.1 Hz or lower.

The hydrogenated block copolymer can be obtained by producing a block copolymer comprising two polymer blocks mainly comprising vinylaromatic monomer units and one polymer block mainly comprising butadiene monomer units by the method described, e.g., in Examined Japanese Patent Publications Nos. 36-19286, 43-14979, and 49-36957, i.e., by conducting successive polymerization in a hydrocarbon solvent using an anionic polymerization initiator comprising, e.g., an organolithium compound and a 1,2-bond content regulator comprising an ether compound, e.g., diethyl ether or tetrahydrofuran or a tertiary amine, e.g., triethylamine or N,N,N',N'-tetramethylethylenediamine, or optionally further using as a coupling agent a bifunctional compound such as, e.g., dimethyldichlorosilane, ethyl benzoate or phenyl benzoate, and then hydrogenating the block copolymer by a known method, e.g., the method described in Examined Japanese Patent Publication No. 42-87045, so that the resultant hydrogenated polymer is within the scope of the present invention.

In particular, in the present invention, when the polymerization for producing a polymer block mainly comprising butadiene monomer units is conducted in a reactor which, during the polymerization, has a peak internal temperature of 85° C. or lower and a temperature difference ($\Delta T$), which is the difference between the maximum and the minimum temperatures during the polymerization, of 15° C. or smaller, then the hydrogenated block copolymer to be finally obtained has a reduced quantity of heat of crystal fusion ($\Delta H$). In order to regulate the reactor so as to have a peak internal temperature of 85° C. or lower and a temperature difference ($\Delta T$) of 15° C. or smaller, it is necessary to remove the heat of reaction by cooling. Peak temperatures exceeding 85° C. or temperature differences ($\Delta T$) exceeding 15° C. are undesirable in that the block copolymer has an increased quantity of heat of crystal fusion ($\Delta H$) and the composition to be finally obtained will have an impaired brittle temperature. The more preferred range of the peak internal temperature of the reactor is up to 80° C. and that of the temperature difference ($\Delta T$) thereof is up to 10° C. In the present invention, the hydrogenated block copolymer has a quantity of heat of crystal fusion ($\Delta H$) smaller than 0.05 J/g. If the $\Delta H$ thereof is 0.05 J/g or larger, the composition to be obtained will have an elevated brittle temperature. The quantity of heat of crystal fusion ($\Delta H$) can be generally determined by DSC.

The hydrogenated block copolymer of the present invention may be modified by incorporating functional groups thereinto through addition reaction with an unsaturated carboxylic acid or a derivative thereof.

The polypropylene resin composition of the present invention is a composition comprising:

(1) from 99 to 60 parts by weight of a polypropylene resin; and (2) from 1 to 40 parts by weight of the hydrogenated block copolymer of the present invention.

If the amount of the hydrogenated block copolymer is smaller than 1 part by weight, impact resistance, brittle temperature and elongation are impaired. If the amount thereof exceeds 40 parts by weight, rigidity is impaired. If desired and necessary, a hydrogenated block copolymer which has a hydrogenated conjugated diene polymer block and is different in kind from the hydrogenated block copolymer of the present invention can also be used.

The polypropylene resin (1) used in the resin composition of the present invention is a resin obtained by polymerization propylene as the main monomer if desired with one or more monomers selected from ethylene, $\alpha$-olefins having 4 to 12 carbon atoms, e.g., 1-butene, 1-octene, isobutylene and 4-methyl-1-pentene, and the like. Examples thereof include propylene homopolymer, propylene block copolymers, propylene random copolymers, and mixtures thereof. The polypropylene resin may be a mixture of such polymers differing in molecular weight or composition. Especially preferred are propylene block copolymers. Comonomers usable for producing block or random copolymers of propylene are ethylene and $\alpha$-olefins other than propylene. Of these, ethylene is desirable. These copolymers desirably have a propylene content of 55 mol % or higher. In propylene block copolymers for which ethylene or an $\alpha$-olefin was used as a comonomer, the propylene homopolymer blocks constitute a continuous phase and the ethylene or $\alpha$-olefin blocks constitute a dispersed phase. The content of this dispersed-phase ingredient is desirably from 5 to 30 wt % based on the propylene block copolymer. This dispersed phase may contain polyethylene. The melt flow rate of the polypropylene resin for use in the present invention (as measured in accordance with JIS K7210 (the version published in 1976), conditions L) is desirably in the range of from 0.1 to 200 g/10 min, and is preferably 50 g/10 min or higher from the standpoints of rigidity and moldability.

In the case where a mixture of two of more polypropylene resins is to be used, at least one of the polypropylene resins preferably has a melt flow rate of 50 g/10 min or higher from the standpoints of rigidity and moldability.

The polypropylene resin may be produced by any of conventionally known polymerization methods. Examples thereof include transition polymerization, radical polymerization and ionic polymerization.

A preferred polypropylene resin composition according to the present invention comprises:

(1) from 99 to 60 parts by weight of a polypropylene resin;

(2) from 1 to 40 parts by weight of the hydrogenated block copolymer of the present invention; and (3) from 1 to 40 parts by weight of an ethylene-α-olefin copolymer rubber.

If the amount of the ethylene-α-olefin copolymer rubber is smaller than 1 part by weight, impact resistance, brittle temperature and elongation tend to be impaired. If the amount thereof exceeds 40 parts weight, rigidity is impaired. The ethylene-α-olefin copolymer rubber may be any rubber formed by copolymerizing ethylene with one or more of α-olefins having 3 to 12 carbon atoms, e.g., propylene, 1-butene, isobutylene and octene. However, an ethylene-octene copolymer is preferred from the standpoints of brittle temperature and rigidity. The copolymer preferably has a α-olefin content of 15 wt % or higher. In particular, an ethylene-octene copolymer having an octene content of 15 wt % or higher is preferred because it is excellent in brittle temperature and rigidity. Ethylene-α-olefin copolymers having a specific gravity of 0.880 g/cc or smaller are preferred because such copolymers are excellent in brittle temperature rigidity.

These ethylene-α-olefin copolymers are not particularly limited in polymerization method. However, those obtained by polymerization with a metallocene catalyst having even active sites are preferred, for example, because they have a small specific gravity. The polymerization system may be either a homogenous solution system or a slurry system.

A more preferred polypropylene resin composition according to the present invention comprises:

(1) from 99 to 60 parts by weight of a polypropylene resin;

(2) from 1 to 40 parts by weight of the hydrogenated block copolymer of the present invention;

(3) from 1 to 40 parts by weight of an ethylene-α-olefin copolymer rubber; and (4) from 1 to 30 parts by weight of an inorganic filler.

If the amount of the inorganic filler is smaller than 1 part by weight, rigidity tends to be impaired. If the amount thereof exceeds 30 parts by weight, impact resistance is impaired. Examples of the inorganic filler include calcium carbonate, talc, magnesium hydroxide, mica, barium sulfate, silicic acid (white carbon), titanium oxide, and carbon black.

The polypropylene composition of the present invention can contain a stabilizer, lubricant, colorant, silicone oil, flame retardant, etc. Examples of the stabilizer include hindered phenol antioxidants, phosphorus compound stabilizers, hindered amine light stabilizers, and benzotriazole type UV absorbers. Examples of the lubricant include stearic acid, stearic esters, metal salts of stearic acid, amorphous silica, talc, and mica.

The polypropylene resin composition of the present invention can be prepared with apparatuses for use in the mixing of ordinary polymeric materials, according to the proportions of the ingredients. Examples of the apparatuses include kneaders such as a Banbury mixer, Labo Plastomill, single-screw extruder, and twin-screw extruder. Melt mixing with an extruder is preferred from the standpoints of productivity and satisfactory kneading.

The present invention will be explained below in greater detail by reference to the following Examples, but the invention should not be construed as being limited to the Examples.

EXAMPLES

Methods for property measurements are shown below.

MFR: in accordance with JIS K7210, conditions L.

Izod impact strength: measured in accordance with JIS K7110, with notch.

Brittle temperature: in accordance with JIS K7216.

Flexural modulus: in accordance with JIS K7203, with a flexing rate of 2 mm/min.

Heat distortion temperature: in accordance with JIS K7207, with a load of 0.45 MPa.

Tensile test: in accordance with JIS K6758, with a pulling rate of 20 mm/min.

(I) Ingredients (1) Polypropylene Resins

Use was made of propylene block copolymers PP1 (MK755H, manufactured by Nippon Polyolefin Co., Ltd.; MFR, 63 g/10 min) and PP2 (MK711H, manufactured by Nippon Polyolefin Co., Ltd.; MFR, 43 g/10 min).

(2) Hydrogenated Block Copolymers

Using n-butyllithium as an initiator and tetrahydrofuran as a 1,2-bond content regulator, styrene and butadiene were subjected to an anionic block copolymerization in cyclohexane solvent in the order of styrene, butadiene, and styrene. Thus, a styrene-butadiene block copolymer was produced. During the polymerization of butadiene, cooling was conducted in order to remove the heat of reaction. Furthermore, the peak internal temperature of the reactor and the temperature difference ($\Delta T$) which was the difference between the maximum and the minimum temperatures inside the reactor during the butadiene polymerization were recorded. In order to lower the peak temperature or narrow the temperature difference ($\Delta T$), measures were taken such as reducing the concentration of butadiene monomer in the reaction system and reducing the butadiene monomer feed rate, in addition to cooling.

Subsequently, the styrene-butadiene block copolymer obtained was hydrogenated at a hydrogen pressure of 5 kg/cm$^2$ and a temperature of 50° C. using bis($\eta^5$-cyclopentadienyl)titanium dichloride and n-butyllithium as hydrogenation catalysts. Polymer structure was regulated by changing monomer feed amount and feed order, and MFR was regulated mainly by changing catalyst amount. The content of 1,2-bonds was regulated by changing the amount of the 1,2-bond content regulator, polymerization temperature and temperature difference ($\Delta T$), and order-disorder transition temperature ($T_{ODT}$) was regulated by changing styrene content, MFR and 1,2-bond content. Furthermore, the degree of hydrogenation was regulated by changing the time for hydrogenation.

The quantity of heat of crystal fusion ($\Delta H$) was determined by examining a sample with 7 Series Thermal Analysis system, manufactured by PERKIN-ELMER Corp., at a heating rate of 10° C./min to obtain DSC curve and calculating the peak area thereof. The sample of a hydrogenated block copolymer subjected to the DSC curve determination was one which had undergone sufficient crystallization after melt molding. Styrene content was determined with an ultraviolet spectrophotometer (UV), and 1,2-bond content and the degree of hydrogenation were determined with a nuclear magnetic resonance spectrometer (NMR). Order-disorder transition temperature ($T_{ODT}$) was determined with mechanical spectrometer RMS800, manufactured by Rheometrics, Inc., in the following manner. Measurement was made under the conditions of 25-mm parallel plates and 0.1 to 100 rad/sec at each temperatures of 230° C. and 200° C. in this order to determine G' and G". The G' was plotted against the G" to obtain straight lines. The temperature at which the plotting came to give a straight line having a gentle slope was taken as the $T_{ODT}$. In the case where a measurement at 200° C. gave a steep slope, the $T_{ODT}$ was judged to be below 200° C. In the case where a measurement at 200° C. gave a gentle slope and a measurement at 230° C. gave a steep slope, the $T_{ODT}$ was judged to be 200° C. or higher but lower than 230° C. In the case where measurements at 200 and 230° C. each gave a gentle slope, the $T_{ODT}$ was judged to be 230° C. or higher. In the case of a sample having too high an MFR, measurement was impossible because it flowed out from the parallel plates. In the case of a sample having too low a styrene content, measurement was impossible since a distinct $T_{ODT}$ was not observed because of sensitivity.

Figure 2:
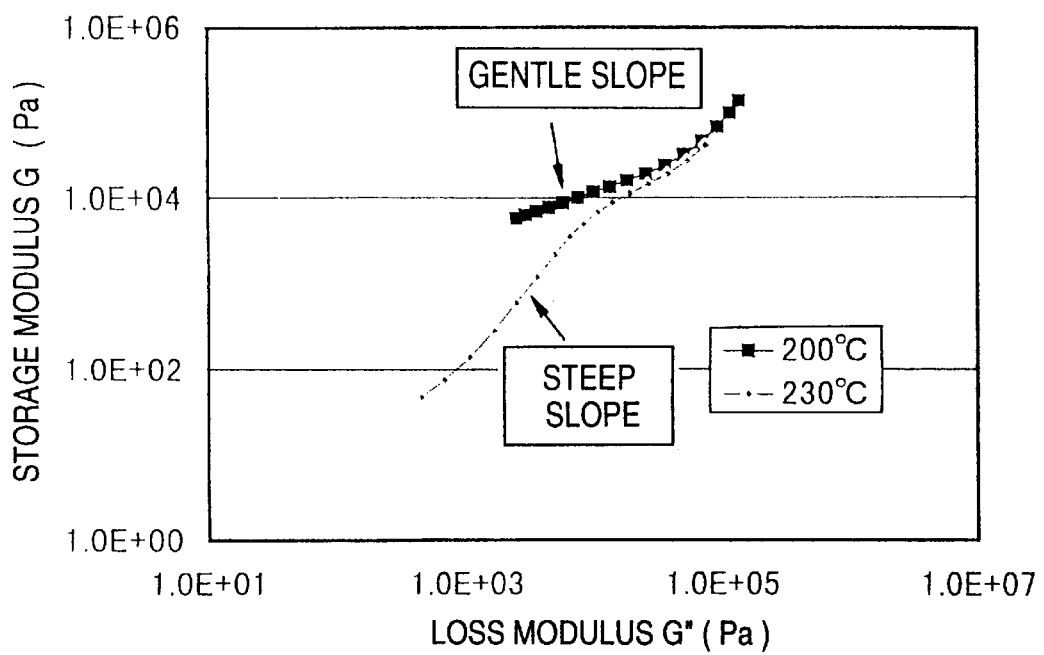
FIG. 2 shows a method for determining the $T_{ODT}$ of SEBS 11.

The method for determining $T_{ODT}$ is shown in FIGS. 1 and 2. The structure of each sample and the found property values therefor are shown in Table 1.

(3) Ethylene-α-olefin Copolymer Rubbers

Use was made of commercial rubbers, i.e., ENGAGE EG8150 (ethylene-octene copolymer), manufactured by Dow Plastics and having an octene content of 25 wt % and a specific gravity of 0.868 g/cc, and EP07P (ethylene-propylene copolymer), manufactured by Japan Synthetic Rubber Co., Ltd. and having a propylene content of 27 wt % and a specific gravity of 0.860 g/cc.

(4) Inorganic Filler (talc)

Use was made of a commercial talk, i.e., Micro Ace P-4, manufactured by Nippon Talk Co., Ltd.

(II) Preparation of Resin Compositions and Property Measurements

Ingredients (1), (2), (3), and (4) were dry-blended in each of the proportions shown in Table 2. The resultant mixtures each was melt-kneaded with a corotating twin-screw extruder (screw diameter, 30 mm) set at 230° C., and then pelletized. Subsequently, these pellets were injection-molded with an injection molding machine set at 230° C. to produce test pieces to be subjected to measurements. The results of property measurements for the test pieces obtained are shown in Table 2. It is apparent from Table 2 that the resin compositions according to the present invention were excellent.

TABLE 1

|  | Structure | Peak polymerization temperature (° C.) | ΔT (° C.) | ΔH (J/g) | Degree of hydrogenation (%) | Styrene content (wt %) | MFR (g/10 min) | 1,2-Bond content (mol %) | Order-disorder transition temperature (=$T_{ODT}$) (° C.) |
|---|---|---|---|---|---|---|---|---|---|
| SEBS 1 | A-B-A | 79 | 9.0 | 0.02 | 99.8 | 17.5 | 4.9 | 51.8 | 230° C. ≤ $T_{ODT}$ |
| SEBS 2 | A-B-A | 74 | 5.0 | 0.04 | 99.7 | 18.0 | 5.0 | 41.9 | 230° C. ≤ $T_{ODT}$ |
| SEBS 3 | A-B-A | 88 | 28 | 0.86 | 99.8 | 20.4 | 5.0 | 40.2 | 230° C. ≤ $T_{ODT}$ |
| SEBS 4 | A-B-A | 74 | 5.0 | 0.02 | 99.8 | 31.0 | 4.5 | 40.5 | 230° C. ≤ $T_{ODT}$ |
| SEBS 5 | A-B-A | 73 | 4.5 | 0.02 | 99.7 | 15.1 | 7.9 | 40.4 | $T_{ODT}$ < 200° C. |
| SEBS 6 | A-B-A | 74 | 4.0 | 0.02 | 99.7 | 20.1 | 0.09 | 40.6 | 230° C. ≤ $T_{ODT}$ |
| SEBS 7 | A-B-A | 74 | 5.0 | 0.02 | 99.7 | 20.8 | 31.0 | 40.7 | unable to be determined |
| SEBS 8 | A-B-A | 70 | 2.0 | not observed | 99.7 | 17.4 | 6.0 | 60.1 | 230° C. ≤ $T_{ODT}$ |
| SEBS 9 | A-B-A | 70 | 1.0 | 0.04 | 99.7 | 21.5 | 7.5 | 36.1 | 230° C. ≤ $T_{ODT}$ |
| SEBS 10 | A-B-A | 70 | 4.0 | 0.02 | 99.7 | 10.1 | 3.1 | 40.3 | unable to be determined |
| SEBS 11 | A-B-A | 76 | 7.0 | 0.03 | 99.9 | 17.0 | 6.0 | 46.1 | 200° C. ≤ $T_{ODT}$ < 230° C. |

TABLE 2

| | | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Ex. 3 | Ex. 4 |
|---|---|---|---|---|---|---|---|---|---|---|---|---|---|
| Formulation | (1) Polypropylene resin | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts | PP1 34 pts PP2 51 pts |
| | MFR (g/10 min) | 50.3 | 50.3 | 50.3 | 50.3 | 50.3 | 50.3 | 50.3 | 50.3 | 50.3 | 50.3 | 50.3 | 50.3 |
| | (2) Hydrogenated block copolymer | SEBS1 8 pts | SEBS2 8 pts | SEBS3 8 pts | SEBS4 8 pts | SEBS5 8 pts | SEBS6 8 pts | SEBS7 8 pts | SEBS8 8 pts | SEBS9 8 pts | SEBS10 8 pts | SEBS1 8 pts | SEBS11 8 pts |
| | (3) Ethylene-a-olefin copolymer rubber | EG8150 7 pts | EG8150 7 pts | EG8150 7 pts | EG8150 7 pts | EG8150 7 pts | EG8150 7 pts | EG8150 7 pts | EG8150 7 pts | EG8150 7 pts | EG8150 7 pts | EP07P 7 pts | EG8150 7 pts |
| | (4) Inorganic filler | 25 pts | 25 pts | 25 pts | 25 pts | 25 pts | 25 pts | 25 pts | 25 pts | 25 pts | 25 pts | 25 pts | 25 pts |
| Property | Izod impact strength, 23° C. (J/m) | 190 | 185 | 180 | 95 | 160 | 65 | 100 | 170 | 180 | 160 | 180 | 190 |
| | Flexural modulus | 2100 | 2150 | 2100 | 2200 | 1900 | 2000 | 2000 | 1850 | 2050 | 1800 | 2050 | 2100 |
| | Brittle temperature (° C.) | −20.5 | −19.6 | −16.5 | −10.8 | −19.0 | −17.5 | −16.6 | −15.5 | −16.0 | −19.2 | −18.0 | −20.4 |
| | Heat distortion temperature (° C.) (load: 0.45 MPa) | 67.0 | 66.5 | 66.0 | 65.0 | 62.0 | 65.0 | 64.0 | 62.0 | 64.5 | 62.5 | 66.0 | 66.0 |

TABLE 2-continued

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Ex. 3 | Ex. 4 |
|---|---|---|---|---|---|---|---|---|---|---|---|---|
| Tensile elongation at break (%) | 70 | 60 | 50 | 24 | 35 | 29 | 19 | 50 | 40 | 34 | 50 | 60 |

All the "pts" used in the above Table represents parts by weight.

POSSIBILITY OF INDUSTRIAL APPLICATION

The hydrogenated block copolymer of the present invention can give a composition having an excellent balance among impact resistance, brittle temperature, tensile elongation at break, rigidity and heat distortion resistance. Due to this effect, the composition is suitable for use as interior automotive materials, exterior automotive materials, tubes, various containers, sheets, etc.

What is claimed is:

1. A hydrogenated block copolymer comprising:

two polymer blocks A mainly comprising vinylaromatic hydrocarbon compound monomer units; and one hydrogenated polymer block B mainly comprising butadiene monomer units, in which at least 90% of olefinically unsaturated double bonds contained in a polymer block mainly comprising butadiene monomer units before hydrogenation have been hydrogenated, wherein a bonding vinylaromatic hydrocarbon compound content in the hydrogenated block copolymer is higher than 13 wt % but lower than 25 wt %, a 1,2-bond content in the unhydrogenated polymer block mainly comprising butadiene monomer units is higher than 40 mol% but lower than 60 mol%, and the copolymer has a quantity of heat of crystal fusion ($\Delta H$) smaller than 0.05 J/g, an order-disorder transition temperature of 200° C. or higher, and a melt flow rate (MFR) value, as determined in accordance with JIS K7210 under the conditions of a temperature of 230° C. and a load of 2.16 kg, of from not smaller than 0.1 g/10 min to smaller than 30 g/10 min.

2. A polypropylene resin composition comprising:

(1) from 99 to 60 parts by weight of a polypropylene resin; and (2) from 1 to 40 parts by weight of the hydrogenated block copolymer according to claim 1.

3. The polypropylene resin composition of claim 2, which further comprises (3) from 1 to 40 parts by weight of an ethylene-α-olefin copolymer rubber.

4. The polypropylene resin composition of claim 3, which further comprises (4) from 1 to 30 parts by weight of an inorganic filler.

5. The hydrogenated block copolymer of claim 1, which has a melt flow rate (MFR) value, as determined in accordance with JIS K7210 under the conditions of a temperature of 230° C. and a load of 2.16 kg, of from not smaller than 0.1 g/10 min to smaller than 15 g/10 min.

6. The hydrogenated block copolymer of claim 1, wherein the unhydrogenated polymer block mainly comprising butadiene monomer units is produced through polymerization in a reactor which, during the polymerization, has a peak internal temperature of 85° C. or lower and a temperature difference ($\Delta T$) of 15° C. or smaller.

7. The polypropylene resin composition of claim 2, wherein the polypropylene resin comprises a propylene block copolymer having a melt flow rate (MFR) value, as determined in accordance with JIS K7210 under the conditions of a temperature of 230° C. and a load of 2.16 kg, of 50 g/10 min or higher.

8. The polypropylene resin composition of claim 3, wherein the ethylene-α-olefin copolymer rubber is an ethylene-octene copolymer.

9. The polypropylene resin composition of claim 3, wherein the ethylene-α-olefin copolymer rubber is an ethylene-octene copolymer which has an octene of 15 wt % or higher.

* * * * *